US007250023B2

(12) United States Patent
Bai

(10) Patent No.: US 7,250,023 B2
(45) Date of Patent: Jul. 31, 2007

(54) DRILL ACCESSORY

(76) Inventor: Li Kun Bai, 2360 Birchmount Rd. Apt. #205, Scarborough, Ontario (CA) M1T 2M4

( * ) Notice: Subject to any disclaimer, the term of this patent is extended or adjusted under 35 U.S.C. 154(b) by 184 days.

(21) Appl. No.: 10/680,146

(22) Filed: Oct. 8, 2003

(65) Prior Publication Data

US 2004/0069099 A1 Apr. 15, 2004

(51) Int. Cl.
*B23Q 3/157* (2006.01)

(52) U.S. Cl. ............................ 483/30; 483/34; 483/43; 483/54; 483/59; 483/65; 279/14; 408/35; 408/117; 408/239 R

(58) Field of Classification Search ............ 483/30–31, 483/34–35, 54, 59, 65, 38, 42, 43; 408/31, 408/35, 117, 238, 239 R; 173/214; 279/14, 279/79–80, 82; 81/177.4, 439, 490
See application file for complete search history.

(56) References Cited

U.S. PATENT DOCUMENTS 431,107 A * 7/1890 Cowley ...................... 173/214
1,138,465 A * 5/1915 Fegley et al. ................. 279/82
2,303,565 A * 12/1942 Luna .......................... 173/214
2,679,770 A * 6/1954 Carter et al. ................ 173/214
5,022,131 A * 6/1991 Hobbs ........................... 29/40
6,053,675 A * 4/2000 Holland et al. ......... 408/239 R
6,506,002 B1 * 1/2003 Cummins .................... 408/35
6,860,489 B2 * 3/2005 Chen ........................... 279/82
2003/0230862 A1 * 12/2003 Peters et al. .................. 279/82

FOREIGN PATENT DOCUMENTS

TW 326734 * 2/1998

* cited by examiner

*Primary Examiner*—Monica Carter
*Assistant Examiner*—Eric A. Gates

(57) ABSTRACT

A tool for a power drill allows fast and convenient loading and unloading of a screw bit, drill bit, or other implement. The user preferably loads the tool with the necessary implements which are then carried with the tool. Each received implement is movable from a storage position to an in use position in drive engagement with the power drill or power screwdriver. The desired implements can rapidly be changed from one to the other, while the implements are retained on the tool.

19 Claims, 18 Drawing Sheets

DRILL ACCESSORY

FIELD OF THE INVENTION

The present invention relates to a tool for receipt in a drill chuck of a power drill or other power device. The tool is designed to releasably receive a plurality of rotary implements such as a drill bits or screw bits which can be moved from a storage position on the tool to an aligned drive position received in a drive shaft of the tool.

BACKGROUND OF THE INVENTION

Power drills and in particular power hand drills are extremely convenient and are commonly used as a power screwdriver. The chuck of the drill is often a keyless chuck allows rapid securement and release of a screw bit or drill bit as opposed to a conventional key drill chuck. Various power drills have included adjacent the hand grip a separate storage area for maintaining one or more screw bits when not in use. It is also known use screw bits that are reversible having different screw bits at each end. It is also known to provide a magnetic screw bit holder which is separately received in the drill chuck. The holder has a socket at one end for releasably engaging a cooperating bit. The screw bit is typically slide inserted into the socket and is removable by hand. This magnetic screw bit accessory reduces the time required to attach the desired screw bit or to replace screw bits. It is less desirable for drill bits as the drill bits tend to pull out of the accessory when the drill bit is being pulled out of the material.

This type of fast securement and release arrangement has proven quite popular and screw bits and drill bits have been sold in a kit form for easy insertion in the drill bit accessory. Although such systems are more convenient than separate securement of the drill bits or screw bits, the kit of the various bits is not always immediately available or requires the user to interrupt the task to allow selection and attachment of the next bit. This attachment procedure is awkward and time consuming and is a particular problem when the replacement bit is not readily available or is dropped during replacement. There are many tasks which are completed by use of a power drill where the user is constantly alternating between two different bits such as a particular size drill bit and a particular screw bit or between two different types of screw bits, etc. Some workers faced with this problem use two different drills.

The present invention provides a tool for a power drill which overcomes a number of these disadvantages.

SUMMARY OF THE INVENTION

A drill accessory according to the present invention comprises an elongate drive shaft having an implement receiving socket at one end thereof and a drive end for engaging a drill chuck at an opposite end. The drill accessory further includes an implement receiving collar mounted on an intermediate portion of the drive shaft to allow rotation of the drive shaft without rotation of the implement receiving collar. The implement receiving collar has at least three implement Receiving recessor each sized for receiving and temporarily storing an implement which is also receivable in said implement receiving socket of said drive shaft.

The implement receiving collar has an outer hand grip area which preferably shields the implements when received in storage position. The collar due to its bearing mounting on the drive shaft can be used as a drill support. In this way, a user can support the drill adjacent the chuck by holding the implement receiving collar.

In a preferred aspect of the invention, the implement receiving collar has an implement receiving carrier associated with each implement receiving recess. Each implement receiving carrier is movable from an implement storage position to an implement in use position.

Each implement receiving carrier in the storage position locates an implement received therein to one side of the drive shaft. Each implement receiving carrier in the in use position, allows rotation of an implement received in the carrier and aligns the implement with said a drive shaft socket. The implement is received in said socket and rotates with the drive shaft without rotation of the implement receiving carrier.

According to an aspect of the invention, each implement receiving carrier is pivotally secured to the implement receiving collar and is pivotally moved between the storage position and the in use position.

According to a further aspect of the invention, the tool includes a plurality of implements and each implement is releasably receivable in any of the implement receiving carriers.

According to yet a further aspect of the invention, each implement is retained in said implement receiving carrier by a releasable spring latch.

In yet a further aspect of the invention, each implement received in any of the implement receiving carriers, is slidably displaceable within the implement receiving carrier.

In yet a further aspect of the invention, each implement receiving carrier has a distal end with an implement receiving port and a pivot securement end opposite the distal end. The pivot securement end is pivotally attached to the implement receiving collar.

In yet a further aspect of the invention, each implement receiving carrier has an elongate shank connecting the distal end and the pivot securement end and the distal end has an outwardly extending flange which includes the implement receiving port.

In yet a further aspect of the invention, the outwardly extending flange in the in use position of the implement receiving carrier aligns the implement receiving port with the implement receiving socket of the drive shaft.

In yet a further aspect of the invention, the outwardly extending flange of each implement receiving carrier in the storage position, positions the outwardly extending flange generally perpendicular to a side of said implement receiving caller and immediately adjacent thereto.

BRIEF DESCRIPTION OF THE DRAWINGS

Preferred embodiments of the invention are shown in the drawings, wherein.

DETAILED DESCRIPTION OF THE PREFERRED EMBODIMENTS

The drill accessory 2 is a revolver rack and can be used with any power drill or power screwdriver having a suitable means for rotating of the elongate drive shaft 4. It is particularly suitable for use with battery powered hand drills having a keyless chuck. The revolver rack 2 allows different implements to be received in the revolver rack for fast replacement of one implement with another implement. For example, a user may load the revolver rack with a particular screw bit and a particular screw drill and can alternate between these two implements while both implements remain conveniently available on the revolver rack.

Figure 2:
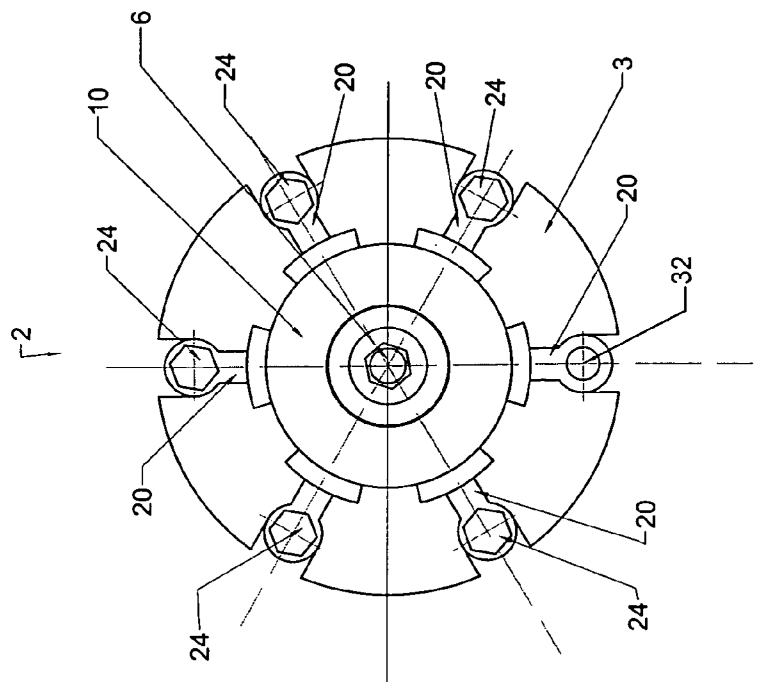
FIG. 2 is top view of the drill accessory.
Figure 1:
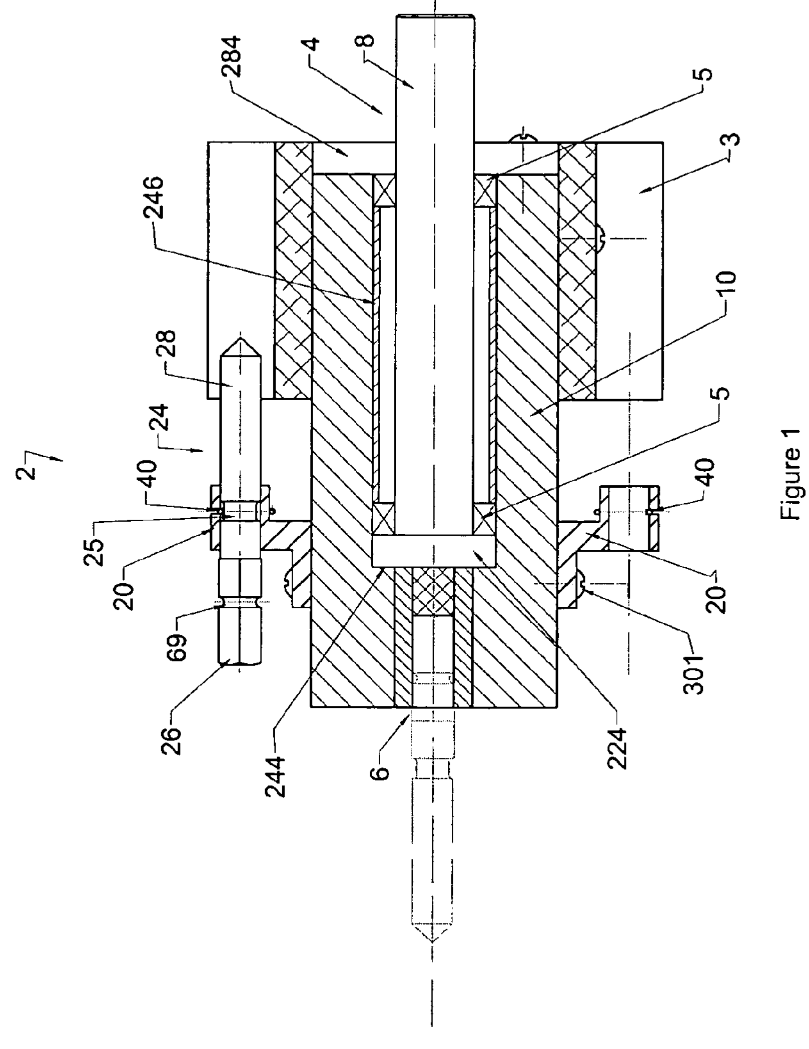
FIG. 1 is a partial sectional view showing the drill accessory.

The revolver rack 2 shown in FIGS. 1 and 2 has an elongate drive shaft 4 with an implement receiving socket 6 and a drive end 8 for insertion in a drill chuck or for connection with a drive source. The implement receiving socket 6 can be hexagonal in cross section for receiving a similar shaped implement and allowing rotation thereof with rotation of the drive shaft. Preferably the implements are slide inserted or removed from the receiving socket 6. Preferably the implements are held in the receiving socket by a magnetic attraction between the socket and the implement. In a preferred embodiment a spring latch retaining mechanism is also provided.

Figure 30:
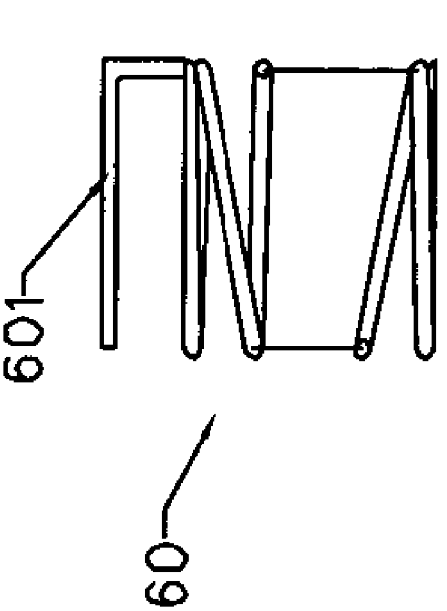
FIG. 30 is a side view of a spring of a spring latch arrangement for maintaining implements.

The revolver rack 2 includes an implement receiving collar 10 mounted by means of bearings 5 to the elongate drive shaft 4. The two ball bearings allow the collar 10 to be held against rotation during rotation of the drive shaft 4. Thus the implement receiving collar is not driven during rotation of the drive shaft. With this arrangement any implements which are received in the collar 10 do not rotate with rotation of the drive shaft. Typically the user uses the collar 10 as a hand grip to steady the drill in use. In some cases, as shown in FIG. 30, a spring arrangement stops any sympathetic rotation of the collar. The elongate drive shaft 4 includes a stop collar 224 which cooperates with the stop shoulder 244 of the implement receiving collar 10. The collar 10 also includes fixed end cover 284. With the support barrel 246, the stop shoulder 244, the stop collar 224 and the fixed end cover 284, the two ball bearing 5 are maintained between the drive shaft 4 and the receiving collar 10. This allows the receiving collar to be easily held regardless of the rotational speed of the drive shaft 4. Thus the user can grip the collar and use the collar as a support position during use of the drill.

The implement receiving collar 10 includes six implement receiving carriers 20. Each carrier 20 is fixed by pins 301 to the receiving collar 10.

In FIGS. 1 and 2, one of these carriers includes an implement 24 which could be a screw bit, drill bit, drill socket, etc. Each implement includes a tool end 28 and a drive end 26 for engagement with the implement receiving socket 6. The implement 24 is slidably displaceable in the receiving carrier 20.

Thus the user can select and insert the particular implements he requires for a particular job and load them into the tool.

To load an implement into the drive shaft, The user removes the implement from the carrier by holding the drive end 26 and overcoming the force of the holding spring 40. The implement is then aligned with the drive shaft and inserted into the implement receiving socket 6. The implement 24 is basically releasably captured on the carrier 20 by means of the holding spring 40 which moves between an engaging position and a release position.

Figure 3:
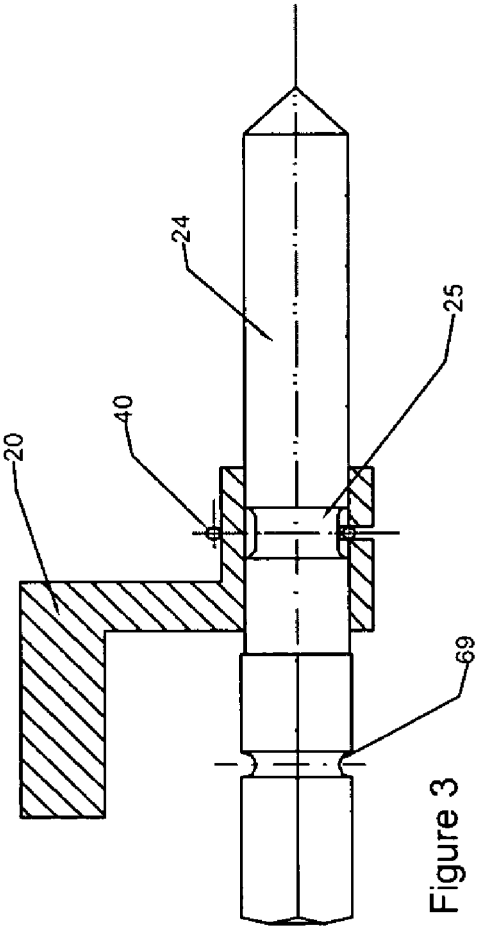
FIG. 3 is partial sectional view of a carrier and a releasably retained implement.
Figure 5:
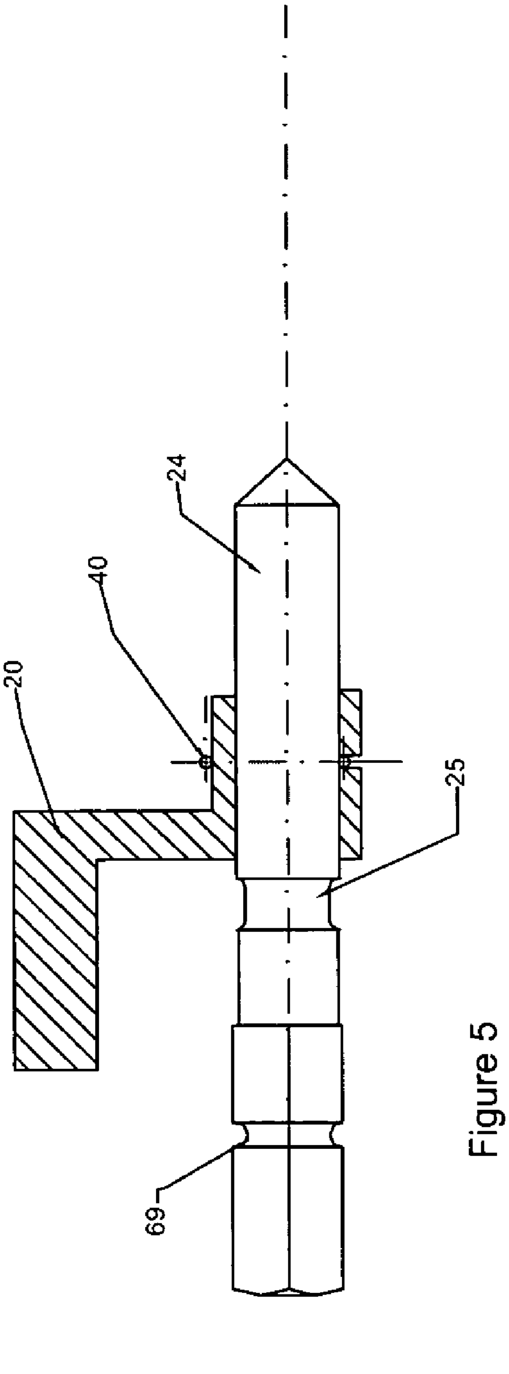
FIG. 5 is a partial sectional view of a carrier with an implement being inserted or released from the carrier.

In FIG. 3, the holding spring 40 is inserted into the groove 25 of the implement 24 whereby the implement is releasably captured on the carrier. The holding spring 40 only extends slightly into the implement receiving socket 24 allowing a user to easily insert and remove an implement while providing sufficient force to retain the implement in the drive socket.

Figure 4:
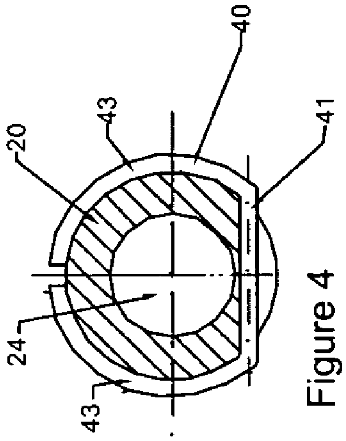
FIG. 4 is an enlarged cross sectional view of the holding spring on the carrier.

FIG. 4 shows the releasable arrangement of the holding spring 40 and the retention of implement 24 in the carrier 20. The holding spring 40 has a retaining portion 41 and two spring arms 43. Spring arms 43 engage the outer portion of the carrier 20 and urge the retaining portion 41 to a locked position shown in FIG. 4. The insertion or removal of an implement causes a cam surface of the implement to move the retaining portion 41 outwardly to a release position. FIG. 3 shows the retaining portion 41 received within the retaining groove 25 of the implement 24.

As shown in FIG. 2, the implement receiving collar preferably has six implement receiving carriers although three or four carriers may be suitable for many applications. The revolver rack 2 allows quick engagement and release of a particular implement carried on the revolver rack. Thus the user can alternate between one or more implements that he has preloaded into the carrier for the particular application. The holder 3 includes 6 carriers 20 each having an implement receiving port 32. Rotation of the holder 3 allows the user to select the desired implement.

The revolver rack of FIGS. 1 and 2 is a simplified arrangement where the user merely inserts the particular implement 24 once the implement 24 has been pulled out from its carrier and hand inserted of into the drive socket. This action is reversed for removal of the implement. Once removed from the drive socket, the implement can be inserted into its carrier and remains available in the storage position as shown in FIG. 1.

The collar of FIG. 1 shows separate attachment of carriers to the collar. It is also possible to have a collar which includes implement receiving sockets. For example, the collar could be injection molded and the implements merely insertable in or removable from sockets.

As can be appreciated, during actual use only one implement will be moved to the drive position and the five other implements will be in the storage position. The actual holder 3 can be held by the user and the receiving collar 10 will not rotate with the drive shaft. This allows the user to operate the drill using both hands for support. One hand is holding the grip of the drill and the other hand is holding the collar 3 of the revolver rack. This two hand operation provides extra stability.

The use of a magnetic force as the only securement of the implement in the drive socket has certain disadvantages particularly for drill bits. The force of magnet does not have sufficient strength to hold a drill bit in the drive socket when the drill bit is being removed from a drilled hole. The drill bit has the tendency of withdrawing from the drive socket and remaining within the hole. A releasable spring latch arrangement is used to hold the implement in the drive socket and thereby overcome this problem.

Figure 7:
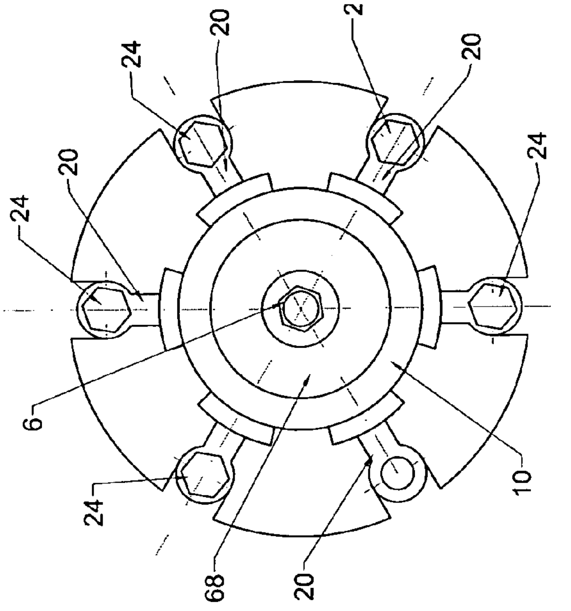
FIG. 7 is the top view of the drill accessory with a two spring lock.
Figure 6:
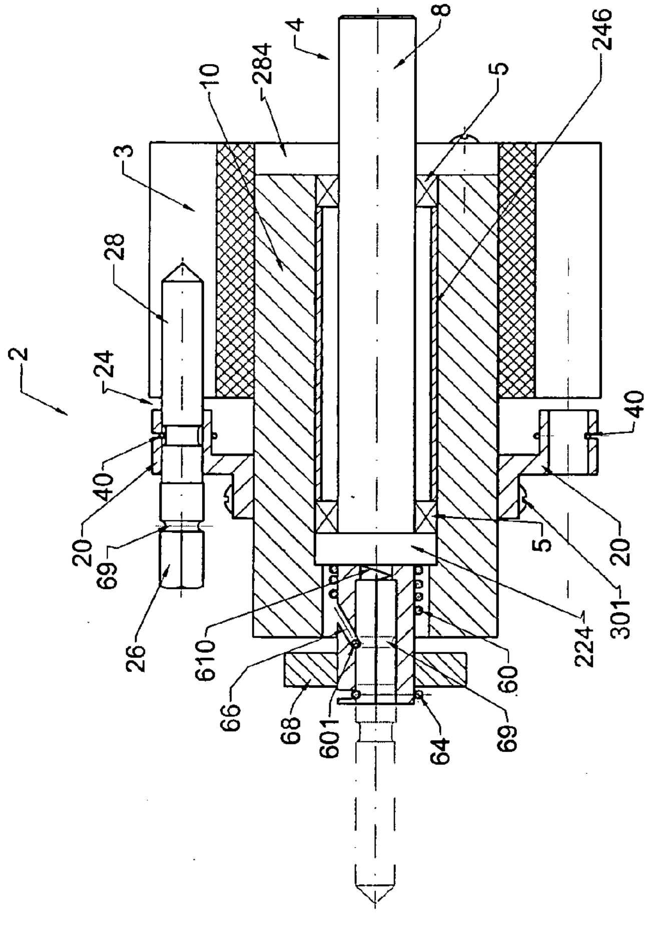
FIG. 6 is the section view of the drill accessory with a two spring lock.

The two spring retention arrangement shown in FIGS. 6 and 7 overcome this problem.

As shown in FIG. 6, the revolver rack 2 includes a releasable spring 60 and a holding spring 64. The elongate drive shaft 4 has an angled slot 66 which receives the bar end 601 of the releasable spring 60. The revolver rack includes a releasing ring 68, which can be pushed toward the angled slot 66. This action causes the bar end 601 of the releasable spring 60 to be moved along the angled slot 60 and out of the groove 69 on the implement thereby releasing the implement (See FIGS. 11 and 12 for details). The compression force of spring 610 urges the implement out of the implement socket 6. The movement of the releasing ring 68 towards the spring 60 causes the bar end 601 to be displaced in the angled groove 66 and thereby be withdrawn from the retaining groove 69 of the implement. The implement is then forced by spring 610 to move towards a releasable position.

If there is nothing to prevent the implement from leaving the socket, the implement will be ejected out of the revolver rack and may fall to the ground. This is not convenient for the user. In order to solve this problem, a holding spring 64 is added.

Figure 8:
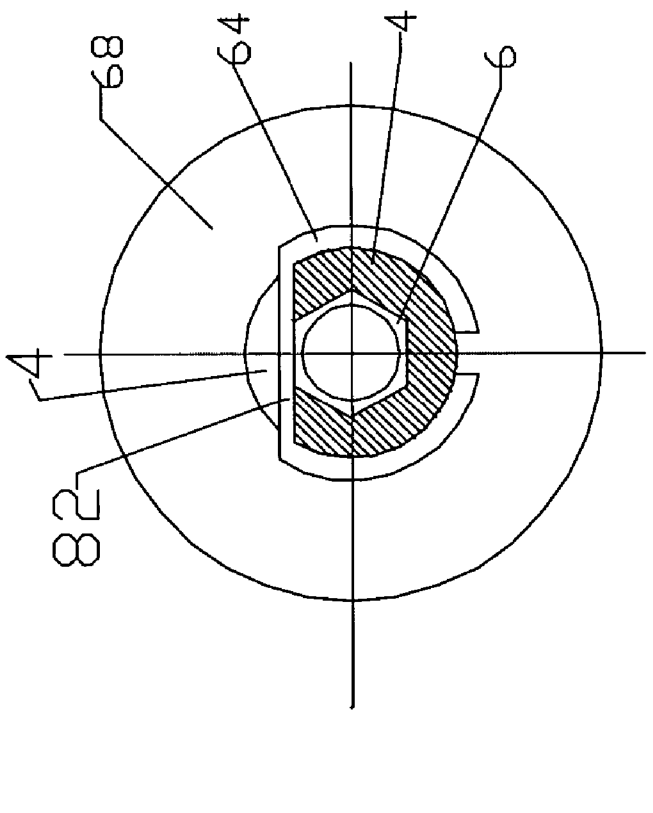
FIG. 8 is the cross sectional view of the first spring of the two spring lock on the drive shaft.

FIG. 8 shows the holding spring 64 secured about the drive shaft 4. The spring has a bar segment 82 which is received in the holding groove 92 of the drive shaft 4.

Figure 9:
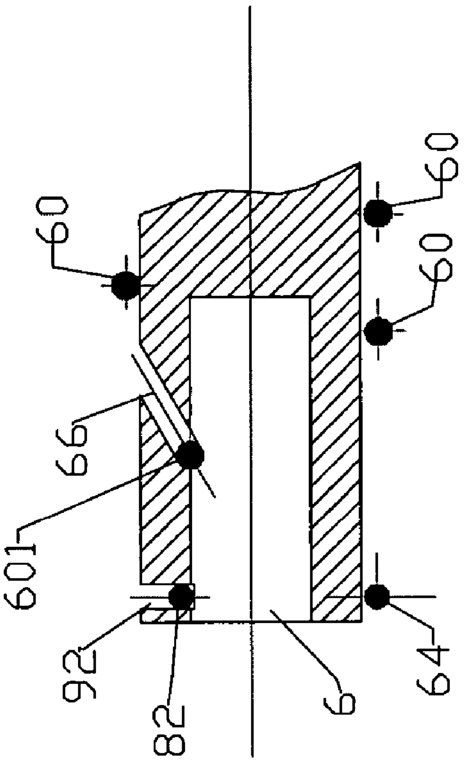
FIG. 9 is the sectional view of the drive shaft of the drill accessory with the two spring lock.

In FIG. 9, it is evident that the depth of the holding groove 92 is less than the depth of the angled slot 66, so the force of the holding spring 64 is less and easily overcome by a user applied pulling force. Thus a user can hand remove the implement from the receiving socket. The spring 64 prevents the implement being freely ejected out of the drive shaft and provides a convenient catch position.

Figure 10:
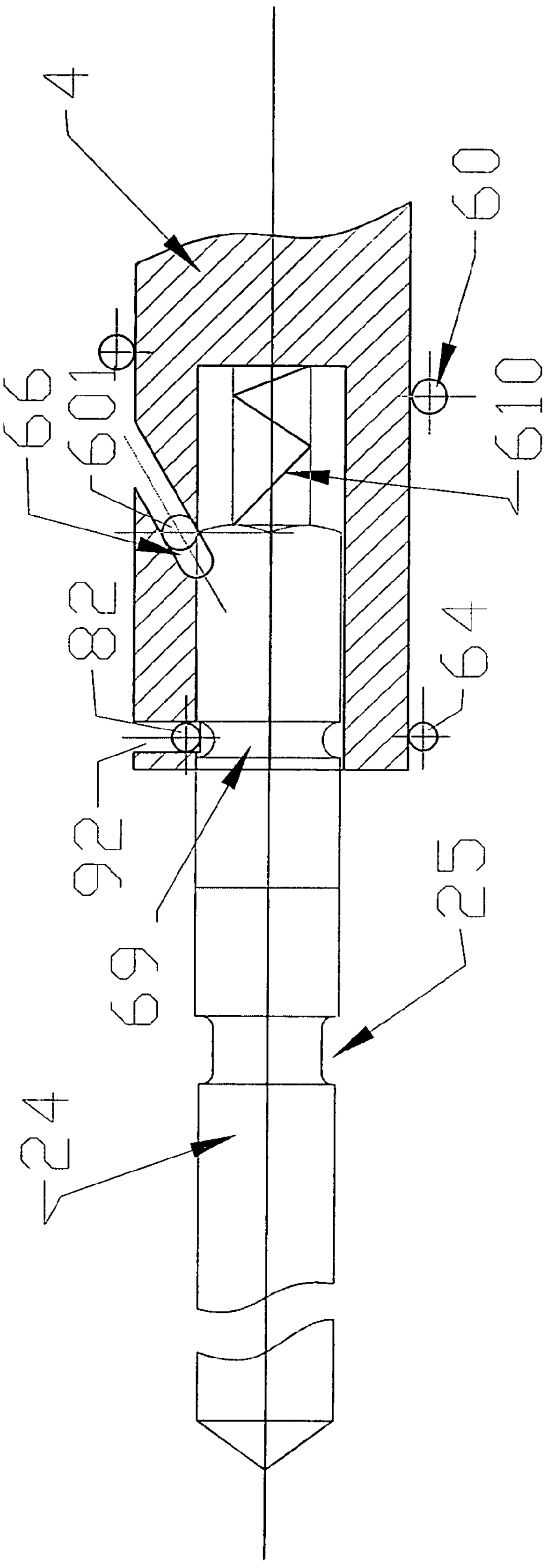
FIG. 10 is a sectional view of the drive shaft of the drill accessory with the two spring lock with an implement in a holding position.

In FIG. 10 the implement 24 has been released as the bar end 601 has been forced outwardly due to movement along the angled groove 66 whereby the implement is no longer captured in the drive socket. The implement 24 is forced by spring 610 to move out of the drive socket. This outward movement is limited by the second holding spring 64 which engages groove 69 as the implement is being forced out of the drive socket. In the fully receiving position of the implement 24, spring 64 is forced radially outwardly and is biased against the implement. The spring 64 engages the groove 69 as it moves past the spring during release of the implement. Thus spring 64 acts as a stop or catch during release of the implement and allows hand removal of the implement.

FIG. 10 shows the holding spring 64 preventing the implement 24 from leaving the receiving socket of the drive shaft by engaging the groove 92. The spring 64 only partially extends into the receiving slot and only partially engages the edge of the implement and allows hand withdrawal or insertion of the implement.

By adding holding spring 64, the implement remains in the receiving socket after initial release from the spring latch 60. The partially released implement is then removed from the socket by the user and stored in the carrier or collar.

Figure 11:
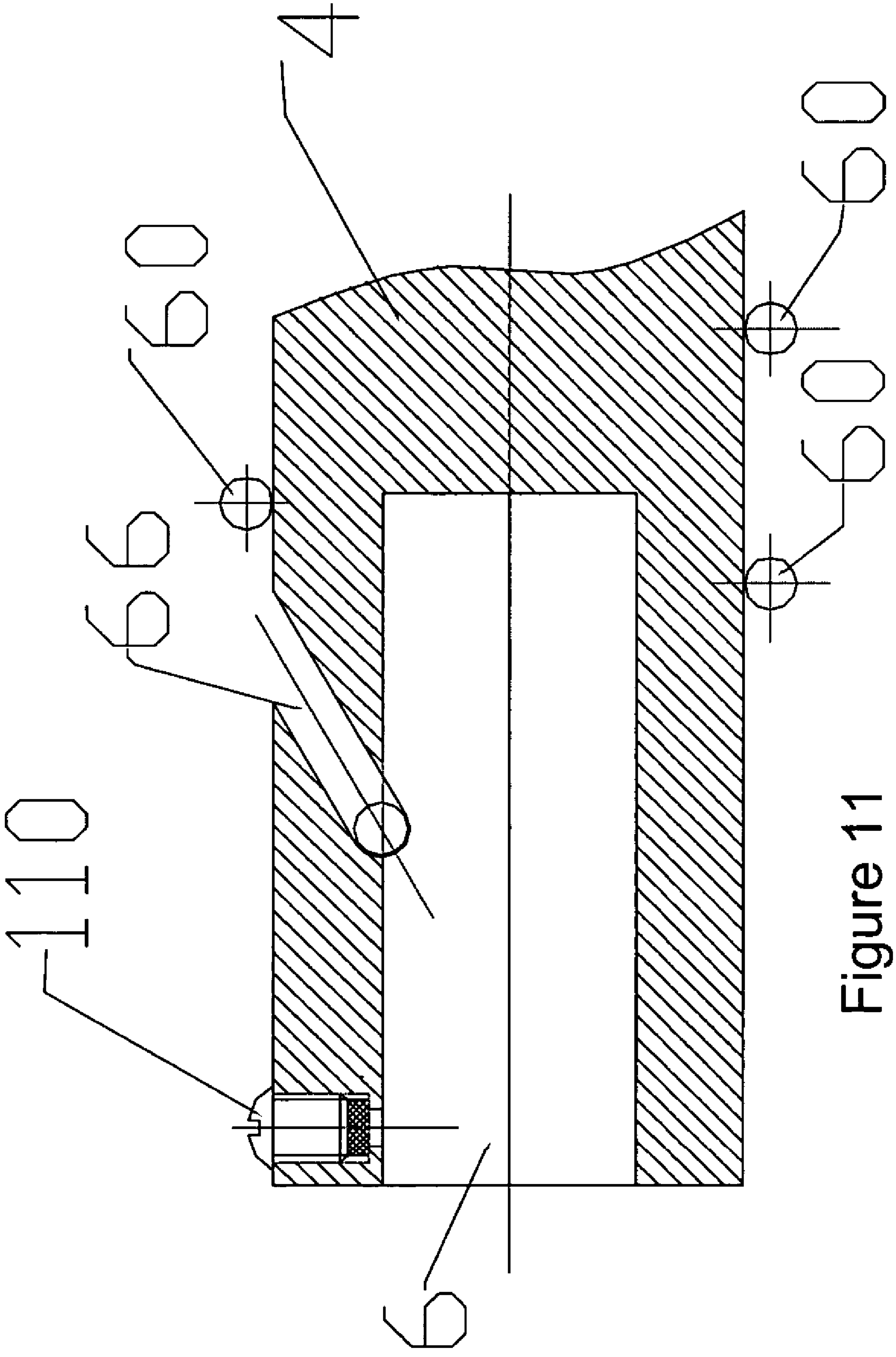
FIG. 11 is a partial sectional view of the drive shaft for a slide magnetic holding.

In FIG. 11, there is another variation of the holding spring. The holding spring is replaced with magnet secured by a screw 110. The magnet will attract the released implement in the receiving socket to hold it within the socket.

Figure 12:
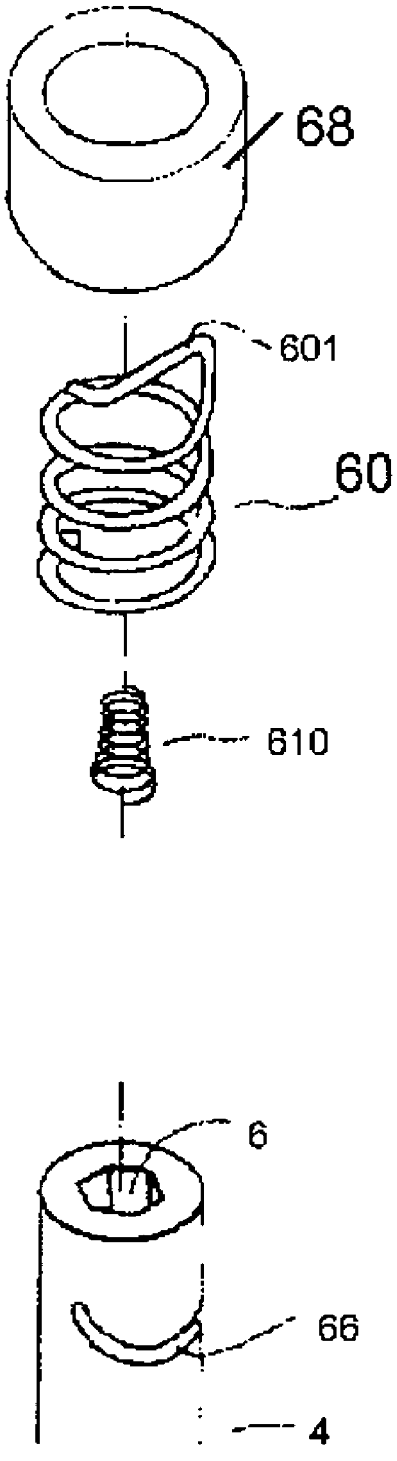
FIG. 12 is an assembly drawing showing the releasable lock spring lock system.
Figure 13:
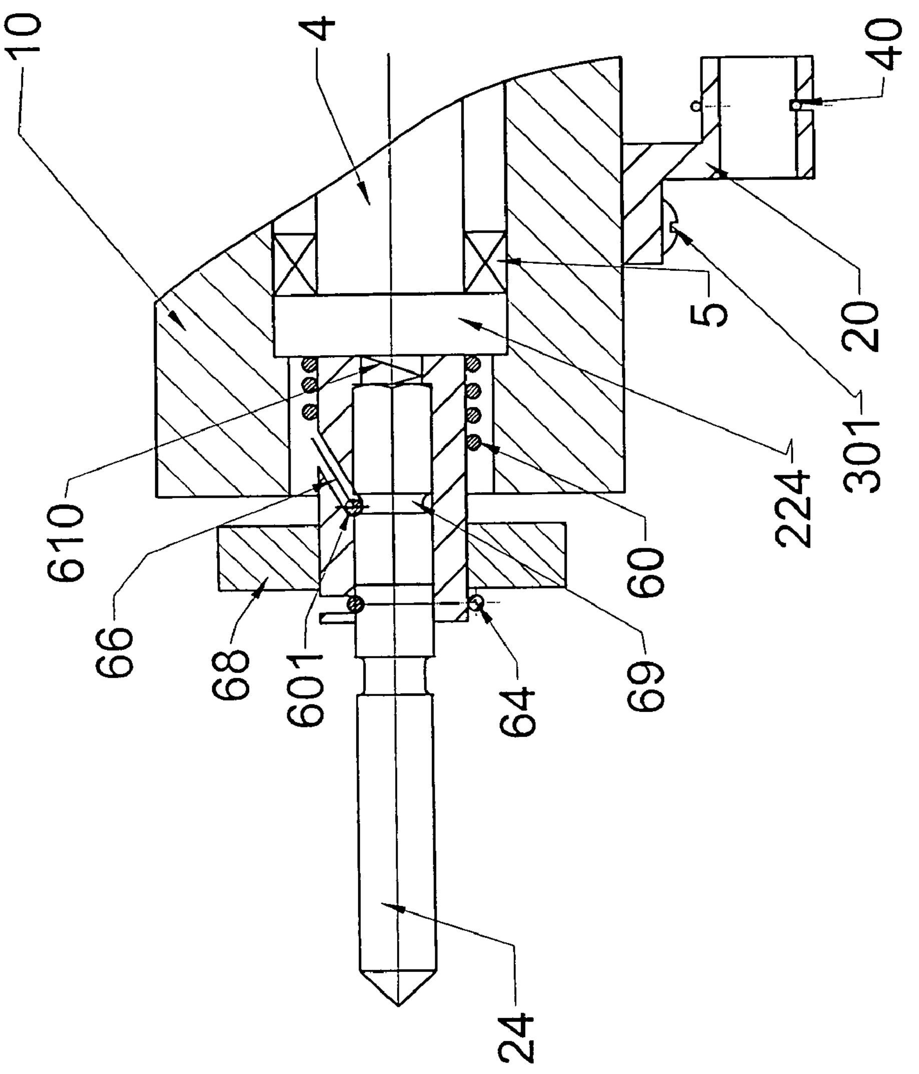
FIG. 13 is a partial sectional view of the drive shaft with the releasable spring lock system.

FIGS. 12 and 13 is a detail of the releasable spring 60 and its mechanism.

In FIG. 12 the bar end 601 of the releasing spring 60 is inserted into the angled slot 66 on the drive shaft 4. When loading the implement, the bar end is pushed along the angled slot outwardly and the implement is locked by the bar end 601. When releasing the implement, the releasing ring 68 is pushed along the drive shaft, the bar end 601 is moved outwardly due to engagement with the angled slot. The implement is urged out of the receiving socket 6 by the spring 610.

FIG. 13 shows a partial section view of the releasable lock system.

Once releasing ring 68 is pushed along the drive shaft 4, it forces the bar end 601 of the releasable spring 60 to retreat along the angled slot 66 and move out of the groove 69 on the implement 24. The implement is then free to move out of the drive socket 6 and the implement is preferably pushed by the spring 610.

The revolver rack 2 requires the user to move the implement from storage position to the working position. This requires not dropping the implement and locating an empty carrier for a used implement.

Figure 15:
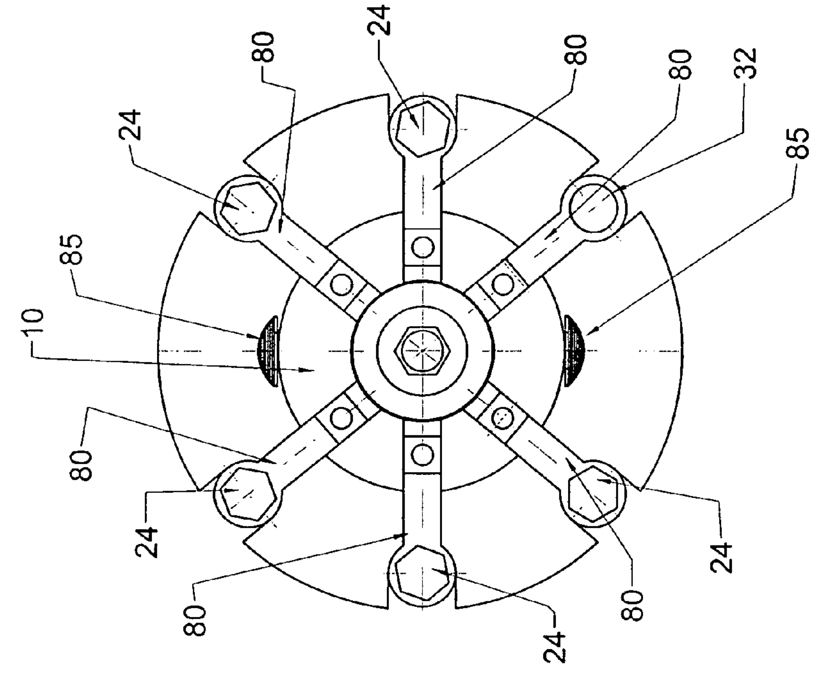
FIG. 15 is a top view of the drill accessory with movable carriers.
Figure 14:
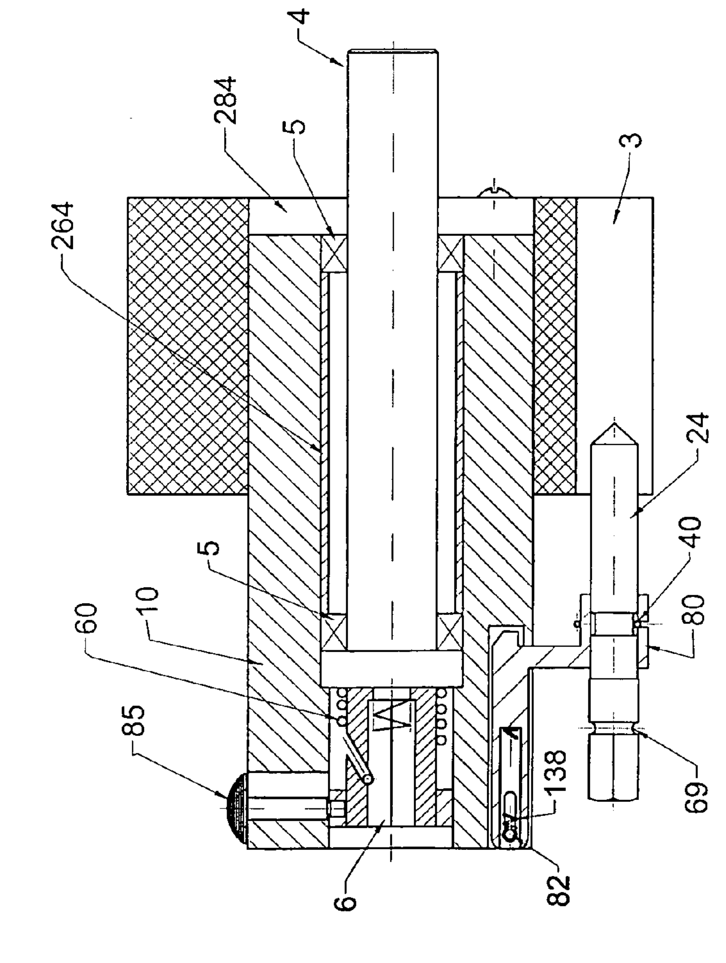
FIG. 14 is a sectional view showing the drill accessory with movable carriers.

In FIGS. 14 and 15 a modified revolver rack is shown with six movable carriers 80. The implement receiving collar 10 holds the six implement receiving carriers 80. Each carrier 80 is secured by a pivot connection 82 to the collar. Each implement 24 is slidably displaceable in the receiving carrier 80 and the implement is free to rotate about its longitudinal axis while being supported by the port 32 of the carrier 80.

To load an implement into the drive shaft, the appropriate carrier is rotated about a pivot point 82 to position the implement in line with the drive shaft and then the implement and its carrier are moved downwardly and the implement is moved into engagement with the implement receiving socket 6. The carrier's pivot connection 82 is moved along the long groove 162 (FIG. 16), with both the carrier and its implement moving downwardly together. The working position of a carrier is shown in FIG. 17. The carrier 80 has been rotated from a storage position to an operative position and remains attached to the particular implement.

Each carrier 80 rotates about the pivot connection 82 defining an offset pivot axis perpendicular to the elongate drive shaft 4.

Figure 16:
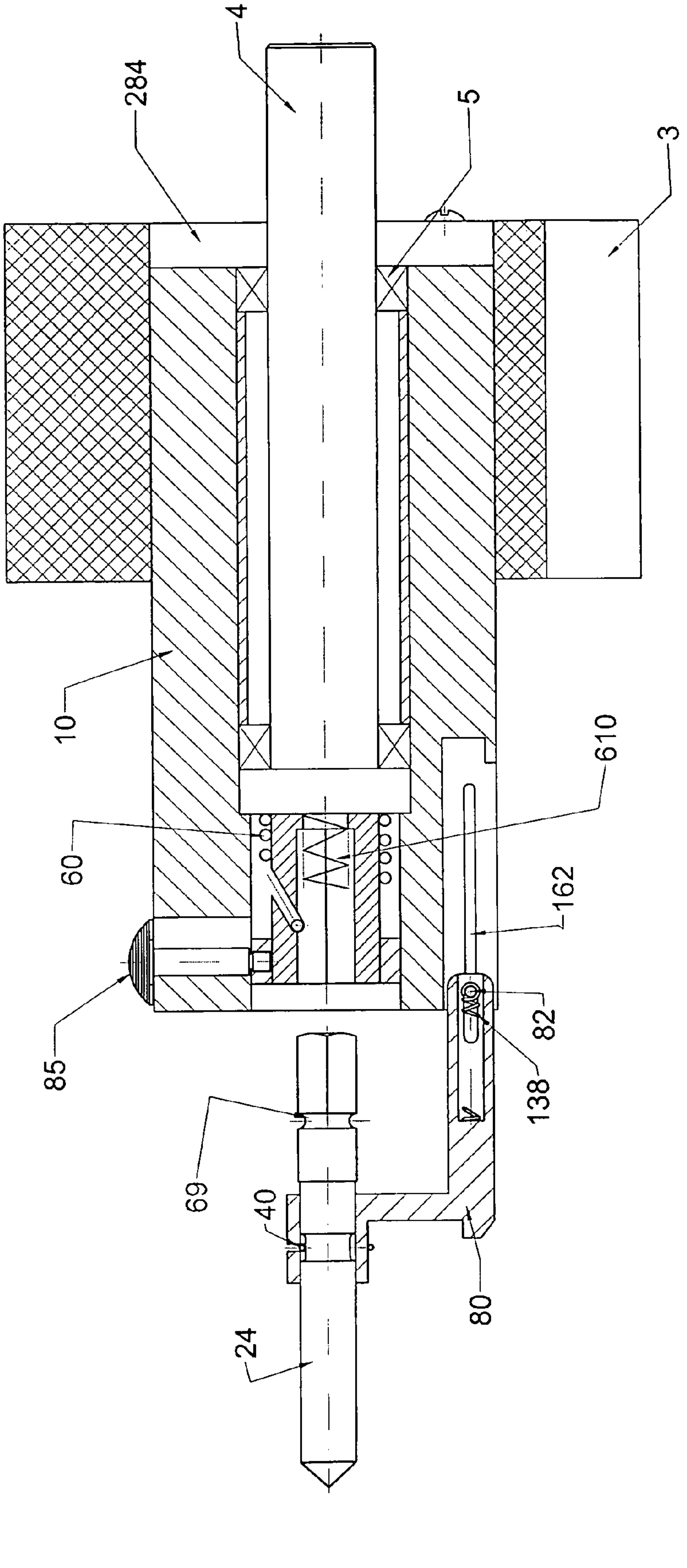
FIG. 16 shows the movement of the carrier with a working implement to a drive position.
Figure 17:
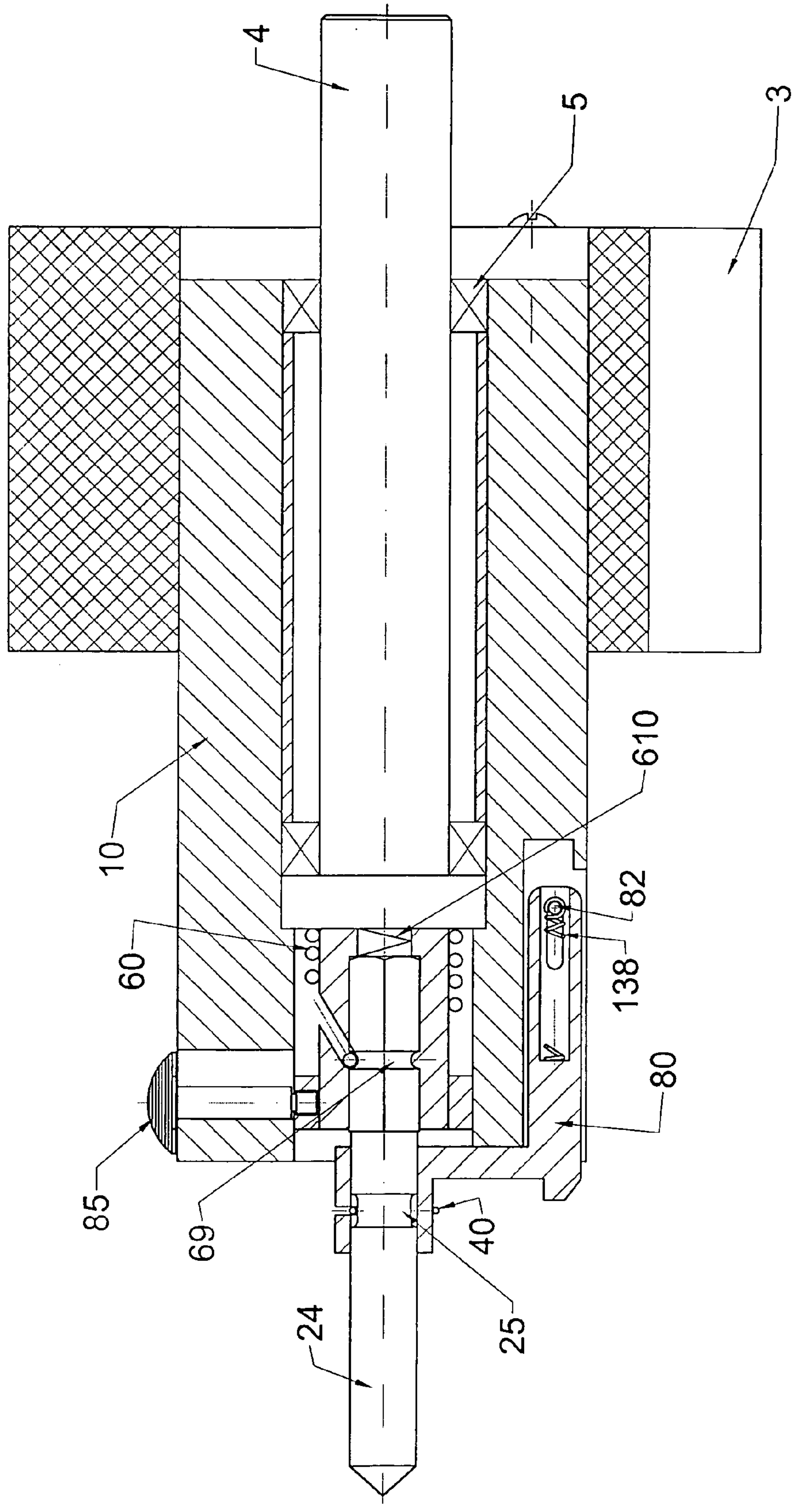
FIG. 17 shows the working Implement received in the drive shaft.

FIG. 16 shows the engagement ready position of the carrier 80 with a typical implement 24. The pivot connection 82 is free to move along the long groove 162.

FIG. 17 shows the implement 24 engaged with the drive shaft 4. The carrier 80 is in working position.

The user merely engages the particular implement 24 once the carrier has been positioned in front of the drive shaft and forces the implement into engagement with the drive socket. For removal of the implement, the user actuates the pair of the releasing buttons 85. The implement is automatically pushed out of the receiving socket with the carrier by the spring 610. Once removed from drive shaft, the carrier with the implement can be rotated approximately 180 degrees to the storage position as shown in FIG. 14.

To prevent the carrier and its implement from accidentally spinning out its storage position, each carrier has its own individual lock as shown in FIGS. 18, 19, 20 and 21. A spring bias arrangement provides a force maintaining this storage position.

Figure 18:
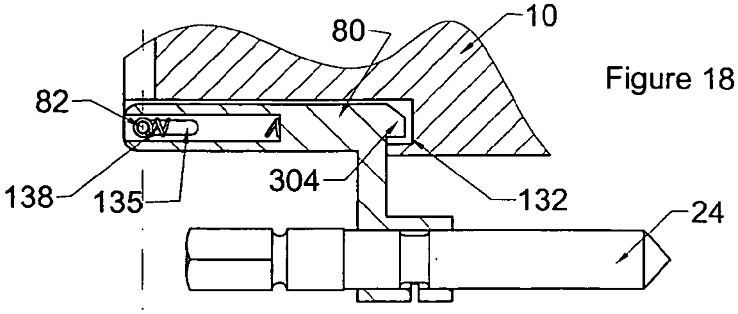
FIGS. 18, 19, 20 and 21 show movement of the carrier from a retained storage position towards an implement drive position.

In FIG. 18, the collar 10 includes a recess 132 which holds the lock tip 304 of the carrier 80 to form a lock system for the carrier. As shown in the lock tip 304 is pushed into the recess 132 of the collar 10 by the lock spring 138 through the pivot connection 82. The pivot connection is blocked by the welding pad 242 on the collar 10. (see FIGS. 24 and 25).

Figure 19:
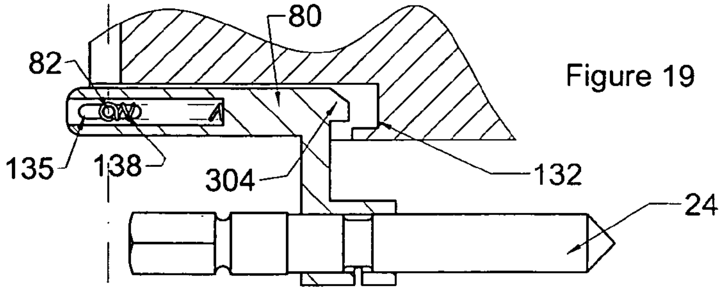

FIG. 19 shows the carrier 80 moved to the left causing the pivot connection 82 to compress the spring 138 inside the elongate hole 135. The lock tip 304 is moved out of the recess 132.

Figure 20:
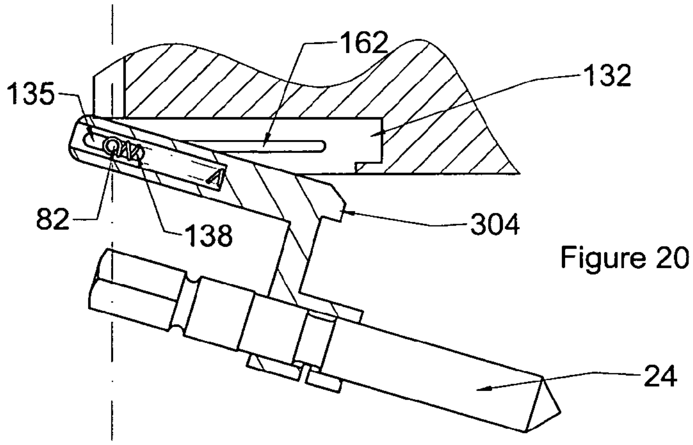

FIG. 20 shows the carrier is rotated by the pivot connection 82.

Figure 21:
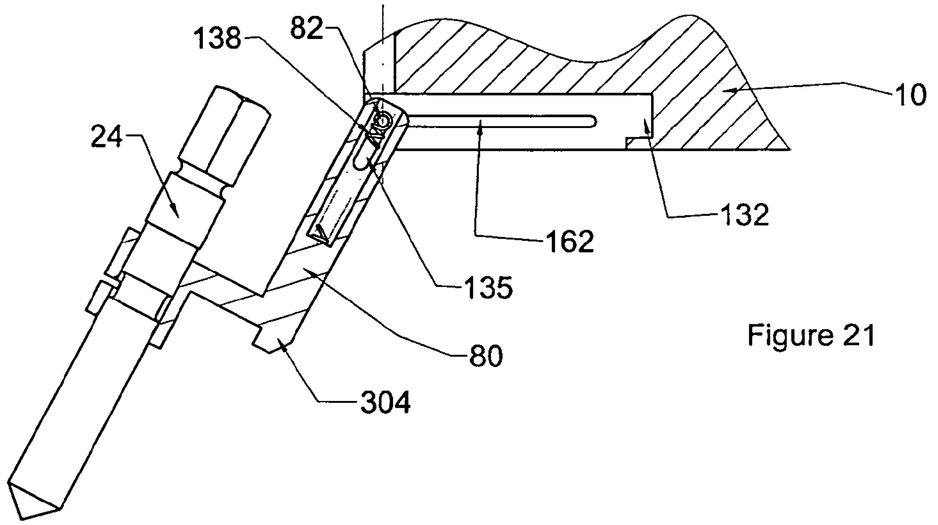

FIG. 21 shows the spring 138 is reset and the pivot connection 82 is pushed to the end of the elongate hole 135. The carrier can be rotated around the pivot connection 82.

To lock the carrier, the user compresses the spring 138 and moves the carrier locking tip into the recess hole 132.

Figure 22:
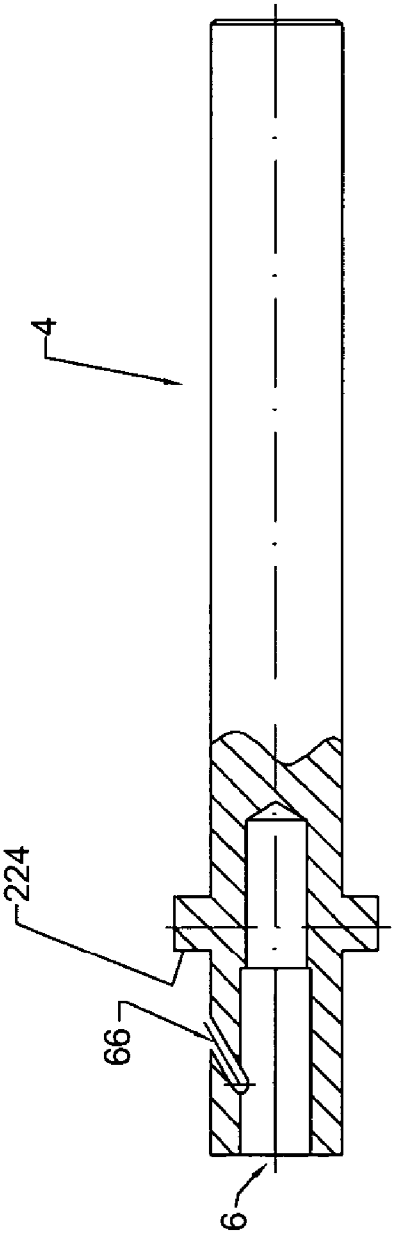
FIG. 22 is a partial sectional view of the drive shaft showing the angled spring retaining slot.

FIG. 22 is a partial section view of the drive shaft 4 with an angled slot 66. The drive shaft includes a receiving socket 6 and a stop shoulder 224.

Figure 23:
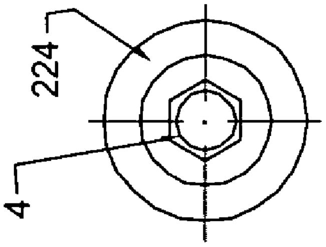
FIG. 23 is an end view of the drive shaft of FIG. 22.

FIG. 23 is an end view of the drive shaft shown in FIG. 22 showing the implement receiving socket.

Figure 24:
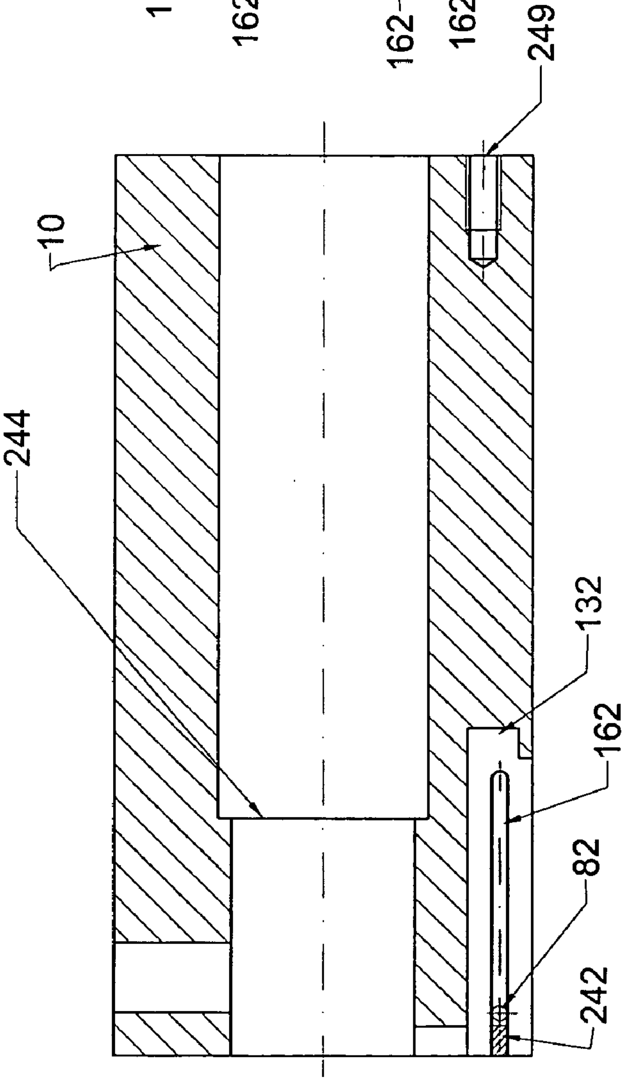
FIG. 24 is a sectional view of the collar.

FIG. 24 is the partial sectional view of the collar 10 having a block pad 242. After the pivot pin 82 is received in the elongate groove 162 with its associated carrier, the block pad 242 can be welded with the collar.

Figure 25:
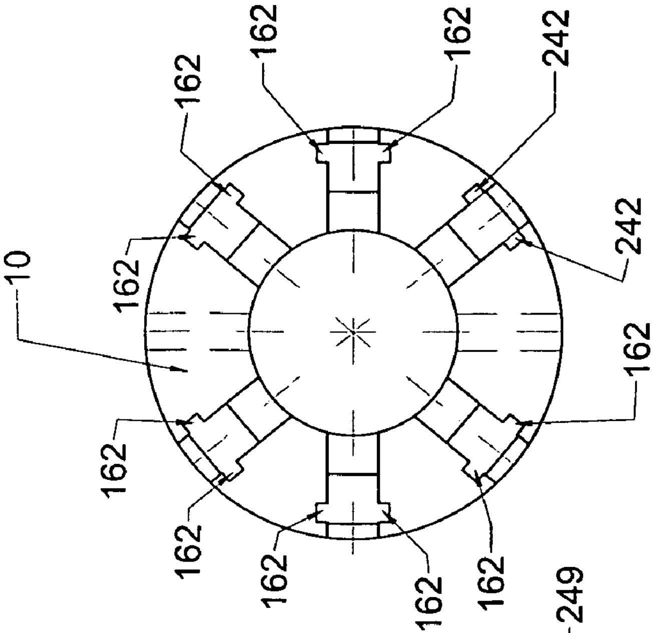
FIG. 25 is a side view of the collar.

FIG. 25 is a top view of the collar 10 with 2 block pad 242.

Figure 26:
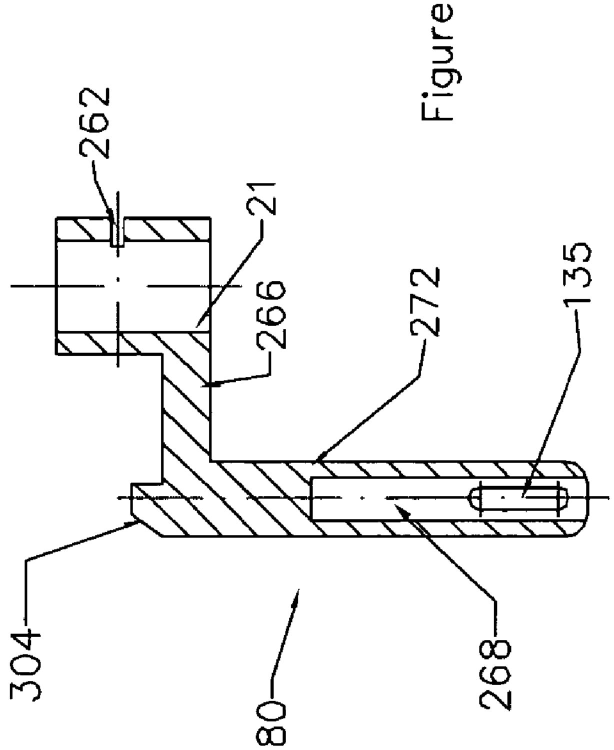
FIG. 26 is a sectional view of a movable carrier.
Figure 27:
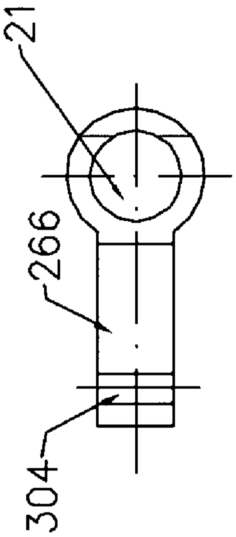
FIG. 27 is a top view of the movable carrier of FIG. 26.

FIGS. 26 and 27 shows a section view and a top view of a carrier 80. The carrier 80 includes a pivot position 135 at one end of the arm 272. An outwardly extending flange 266 is angled generally at a perpendicular direction to the arm 272. The outwardly extending flange 266 includes the circular implement receiving port 21 which allows the rotation of the implement in the carrier. The groove 262 holds the carrier holding spring 40 (see FIG. 3), thus the implement can be secured with the carrier. The arm 272 has a central long hole 268 which retains a spring for the carrier's lock system. The elliptical hole 135 retains the pivot connection 82 and allows the pivot connection to move within the elliptical hole to compress the lock spring in order to unlock or lock the carrier to the storage position.

Figure 28:
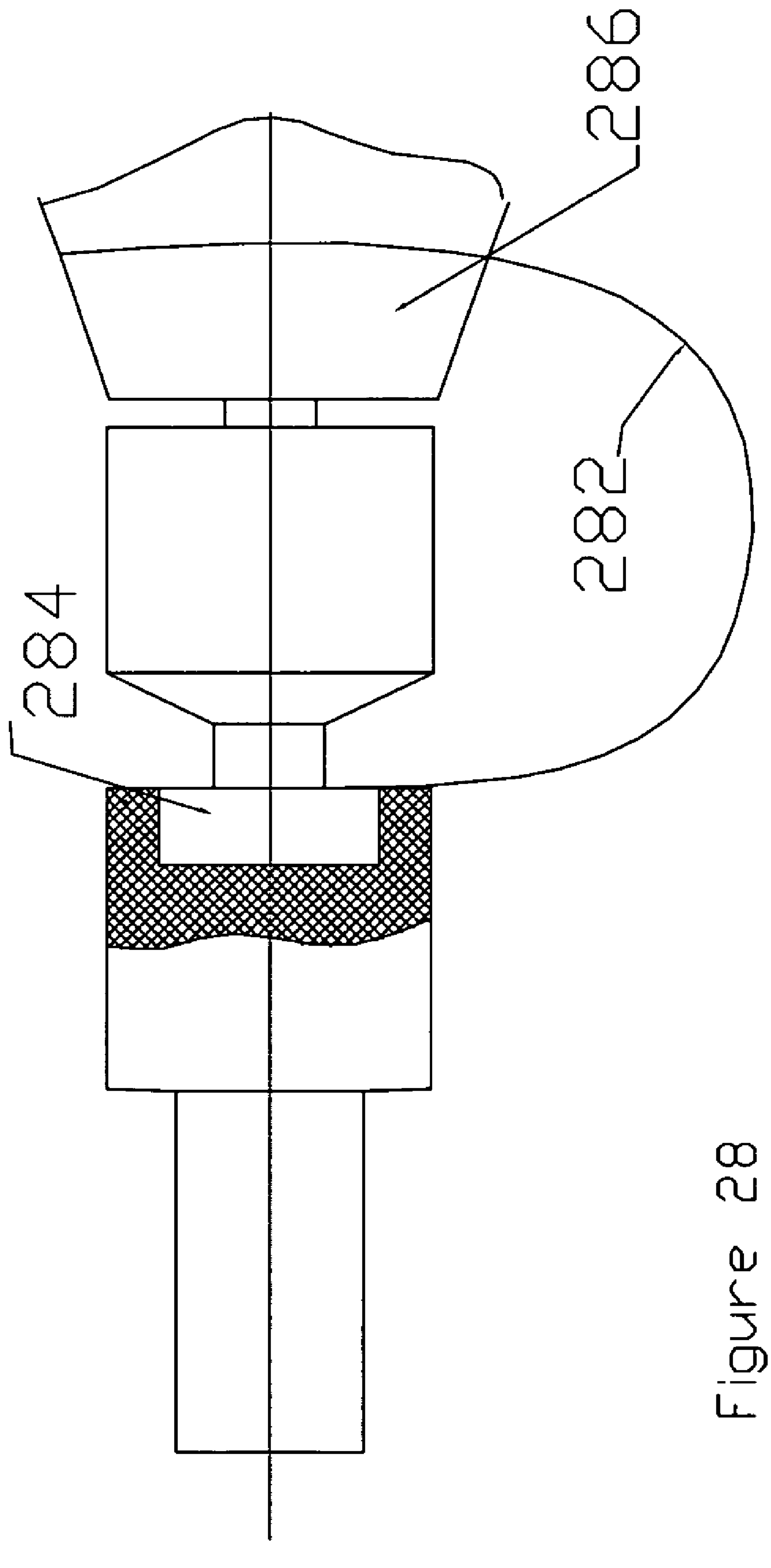
FIG. 28 is a partial side view showing a spring holding arrangement for maintaining the collar against rotation.

FIG. 28 shows details of the accessory spring holding system. There can be circumstances when it is not convenient or desirable to have the user hold the collar against rotation. An accessory spring 282 is used to address this possibility. The user places the accessory spring 282 between the end cover 284 (see FIG. 1) of the revolver rack and the drill body 286. The accessory spring 282 provides a friction force opposing rotation of the collar.

Figure 29:
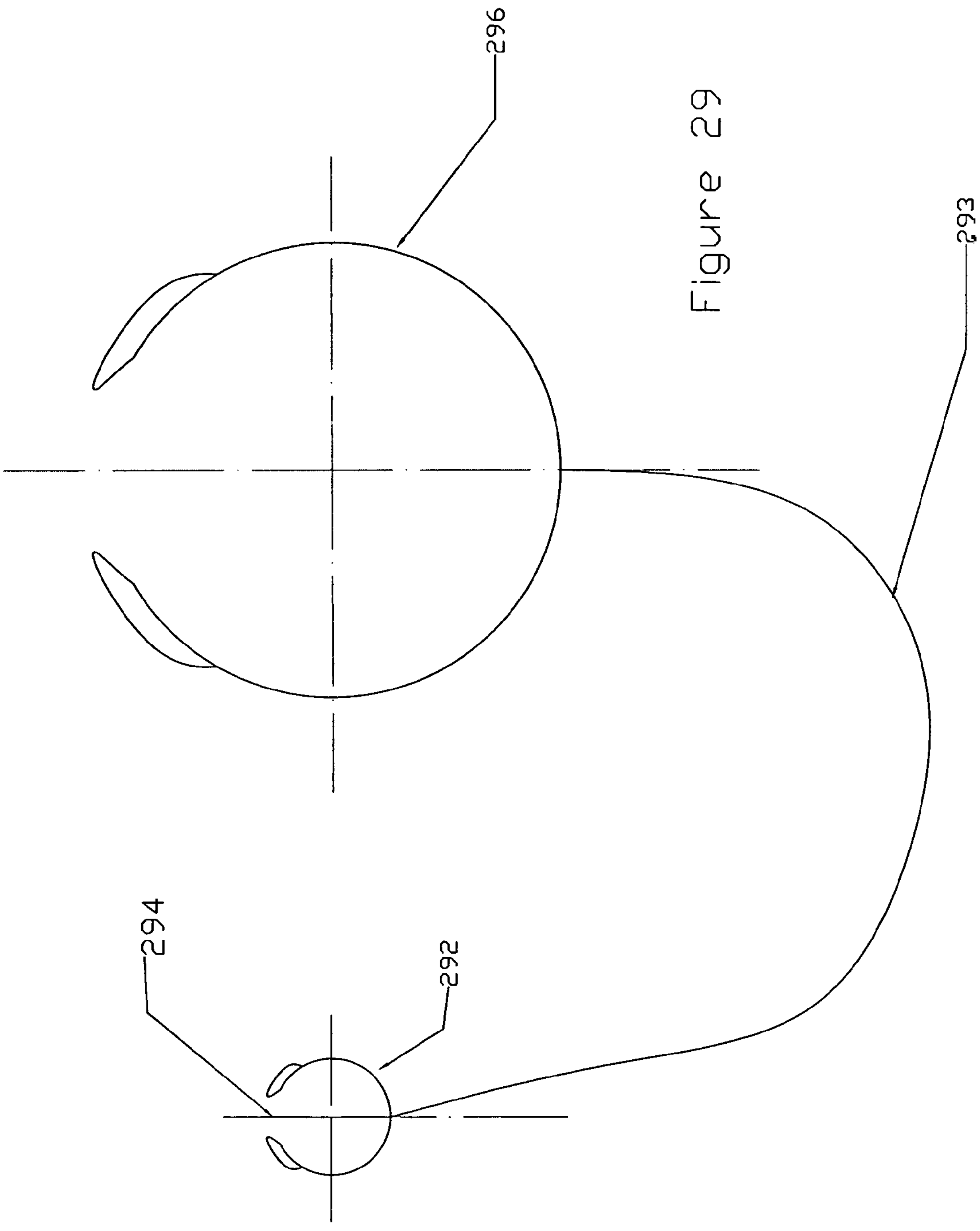
FIG. 29 is a partial view of the spring holding arrangement on a drill.

The mounting of the accessory spring is shown in FIG. 29. The user installs the collar. The small end 292 is located either side of the drive shaft. The opposite end 296 engages the drill body. A spring arm 293 connects the two ends.

FIG. 30 shows a front view of the releasable spring.

Figure 31:
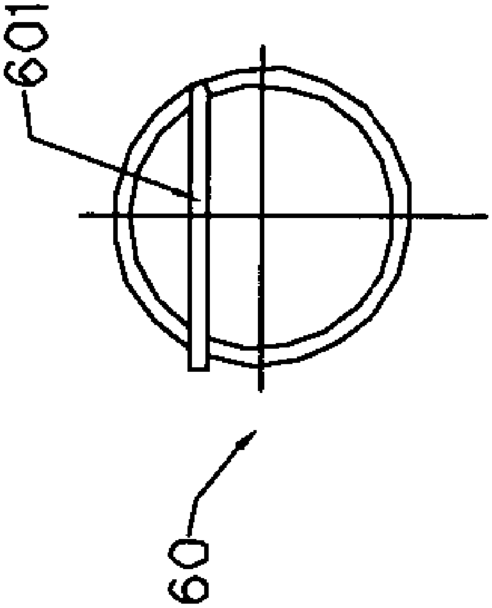
FIG. 31 is a top view of the spring shown in FIG. 30.

FIG. 31 shows a top view of the releasable spring.

The revolver rack allows a user to select various implements necessary for a particular task to be loaded into the tool. Each implement is conveniently movable from a storage position to an operative position. In a preferred embodiment this movement of the implement occurs while remaining captured on the tool. This arrangement keeps all necessary implements readily available and the user can quickly change from one implement to a different implement. Problems associated with dropping implements or difficulty in locating and loading implements quickly are overcome.

The implement carrying collar is rotatably supported on the drive shaft and is preferably held in a stationary position during rotation of the drive shaft.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A tool for receipt in a drill chuck, said tool comprising an elongate drive shaft having an implement receiving socket at one end thereof and a drive end for engaging a drill chuck at an opposite end, said tool further including an implement receiving collar about an intermediate portion of said drive shaft which allows rotation of said drive shaft without rotation of said implement receiving collar, said implement receiving collar having at least 3 implement carriers with each carrier at least pivotally mounted to said collar about a pivot axis offset and perpendicular to said elongate drive shaft for movement between a storage position to an in use position which aligns an implement received in said implement carrier with said implement receiving socket of said drive shaft for receipt therein, each implement receiving carrier in said storage position locating an implement received therein to one side of said drive shaft and each implement receiving carrier in said in use position allowing rotation of an implement received therein and in engagement with said drive shaft socket to rotate with said drive shaft without rotation of said implement receiving carrier, said tool further including a spring biased latch associated with said implement receiving socket for releasably retaining an implement in said drive socket; said spring biased latch including a coil spring having a segment thereof displaceable into and out of said implement receiving socket to form a releasable latch with a retaining groove of an implement received in a drive position within said drive socket; and wherein said spring biased latch is a two position latch, said two position latch having a first position retaining an implement received in said drive socket in a drive position and a second position where an implement is held in said drive socket in a manner to allow hand withdrawal of said implement from said drive socket.

2. A tool for receipt in a drill chuck, said tool comprising an elongate drive shaft having an implement receiving socket at one end thereof and a drive end for engaging a drill chuck at an opposite end, said tool further including an implement receiving collar about an intermediate portion of said drive shaft which allows rotation of said drive shaft without rotation of said implement receiving collar, said implement receiving collar having at least 3 implement carriers with each carrier having an L shape configuration defined by a base arm and an implement receiving arm at one end of said base arm, said base arm at an end thereof opposite said implement receiving arm having a pivot and slide securement to said collar; each pivot and slide securement including a pivot axis of said carrier offset and perpendicular to said elongate drive shaft; said collar including a series of elongate slot recesses extending parallel to said drive shaft with each elongate slot recess partially receiving the base arm of the respective carrier; said pivot axis of each carrier being slidable along the respective slot recess of the collar and movable along the slot recess between a storage position of said carrier at one end of said slot recess and a spaced in use position towards an end of said slot recess slot opposite said one end of said slot recess; each carrier when moved from said storage position to said in use position pivoting about said pivot axis and sliding along said slot recess to align an implement received in said carrier with said implement receiving socket of said drive shaft with said aligned implement being received in said drive socket by sliding movement of said pivot axis of said carrier in said slot recess to said in use position; each implement receiving carrier in said storage position locating an implement received therein to one side of said drive shaft and each implement receiving carrier in said in use position allowing rotation of an implement received therein and in engagement with said drive shaft socket to rotate with said drive shaft without rotation of said implement receiving carrier.

3. A tool as claimed in claim 2 wherein each elongate slot of said collar receives the length of said base arm when the respective carrier is in said storage position and the pivot axis of each carrier includes a pivot shaft captured in the respective slot recess and movable in the length of the respective slot recess.

4. A tool as claimed in claim 2 wherein each elongate slot is of a length greater than a length of said base arm of the respective carrier and each carrier at an end of said base arm opposite said pivot axis includes a latch member for releasably holding said carrier in said storage position.

5. A tool as claimed in claim 4 wherein the pivot shaft of each carrier is received in an elongate port of said base arm and includes a spring member biasing said pivot shaft towards the end of said base arm opposite said implement receiving arm.

6. A tool as claimed in claim 2 wherein each implement receiving recess includes a spring latch that releasably receives an implement and allows hand removal of said implement from said carrier.

7. A tool as claimed in claim 6 wherein each implement when received in a carrier includes a recessed groove intermediate the length of the implement and positioned to one side of said base arm with said recessed groove being engageable with a locking spring associated with said receiving socket of said drive shaft; said locking spring when said implement is received in said implement receiving socket releasably retains the implement in said implement receiving socket.

8. A tool as claimed in claim 2 wherein said implement receiving collar includes a releasable latch longitudinally slidable on said elongate drive shaft between an implement retaining position and an implement release position, said releasable latch including an associated spring bias member urging said releasable latch to said implement retaining position.

9. A tool as claimed in claim 2 including a spring biased latch associated with said implement receiving socket for releasably retaining an implement in said drive socket; said spring biased latch including a coil spring having a segment thereof displaceable into and out of said implement receiving socket to form a releasable latch with a retaining groove of an implement received in a drive position within said drive socket.

10. In a power tool having a motor driven elozigate drive shaft, the improvement including an implement receiving socket at one end of the drive shaft and an implement receiving collar bearingly supported on an intermediate portion of said drive shaft allowing rotation of said drive shaft without rotation of said implement receiving collar; said implement receiving collar having at least 3 implement carriers with each carrier having an L shape configuration defined by a base arm and an implement receiving arm at one end of said base arm, said base arm at an end thereof opposite said implement receiving arm having a pivot and slide securement to said collar; each pivot and slide securement including a pivot axis of said carrier offset and perpendicular to said elongate drive shaft; said collar including a series of elongate slot recesses extending parallel to said drive shaft with, each elongate slot recess partially receiving the base arm of the respective carrier; said pivot axis of each carrier being slidable along the respective slot recess of the collar and movable along the slot recess between a storage position of said carrier at one end of said slot recess and a spaced in use position towards an end of said slot recess slot opposite said one end of said slot recess; each carrier when moved from said storage position to said in use position pivoting about said pivot axis and sliding along said slot recess to align an implement received in said carrier with said implement receiving socket of said drive shaft with said aligned implement being received in said drive socket by sliding movement of said pivot axis of said carrier in said slot recess to said in use position; each implement receiving carrier in said storage position locating an implement received therein to one side of said drive shaft and each implement receiving carrier in said in use position allowing rotation of an implement received therein and in engagement with said drive shaft socket to rotate with said drive shaft without rotation of said implement receiving carrier.

11. In a power tool as claimed in claim 10 wherein each elongate slot of said collar receives the length of said base arm when the respective carrier is in said storage position and the pivot axis of each carrier includes a pivot shaft capturad in the respective slot recess and movable in the length of the respective slot recess.

12. In a power tool as claimed in claim 10 wherein each elongate slot is of a length greater than a length of said base arm of the respective carrier and each carrier at an end of said base arm opposite said pivot axis includes a latch member for releasably holding said carrier in said storage position.

13. In a power tool as claimed in claim 11 wherein the pivot shaft of each carrier is received in an elongate port of said base arm and includes a spring member biasing said pivot shaft towards the end of said base arm opposite said implement receiving arm.

14. In a power tool as claimed in claim 10 wherein each implement receiving recess includes a spring latch that releasably receives an implement and allows hand removal of said implement from said carrier.

15. In a power tool as claimed in claim 14 wherein each implement when received in a carrier includes a recessed groove intermediate the length of the implement and positioned to one side of said base arm with said recessed groove being engagable with a locking spring associated with said receiving socket of said drive shaft; said locking spring when said implement is received in said implement receiving socket releasably retains the implement in said implement receiving socket.

16. In a power tool as claimed in claim 15 wherein said implement receiving collar includes an outer hand grip periphery to be gripped by a user to control the position of said drive shaft during rotation thereof.

17. In a power tool as claimed in claim 10 including a plurality of implements each of which is receivable, and releasably retained in any of said implement receiving carriers.

18. In a power tool as claimed in claim 10 wherein said implement receiving collar includes a releasable latch longitudinally slidable on said elongate drive shaft between an implement retaining position and an implement release position, said releasable latch including an associated spring bias member urging said releasable latch to said implement retaining position.

19. In a power tool as claimed in claim 18 wherein said spring bias member is partially received in a side port of said drive shaft to partially protrude into said implement receiving socket and to rotate with said drive shaft, said releasable latch cooperating with said implement receiving socket to retain said spring bias member partially protruding into said implement receiving socket when said implement receiving collar is in said implement retaining position and wherein each implement includes a retaining groove at one end thereof for receiving said spring bias member to releasably lock the implement when received in said drive shaft socket.

* * * * *